: 2,874,779
Patented Feb. 24, 1959

2,874,779
OIL WELL TREATING METHOD

Carl E. Johnson, Jr., Whittier, Calif., assignor to California Research Corporation, San Francisco, Calif., a corporation of Delaware No Drawing. Application March 23, 1956
Serial No. 573,318

6 Claims. (Cl. 166—42)

The present invention relates to methods of stimulating oil production from declining wells and pertains more particularly to increasing the flow of oil into a borehole from a formation which is partially blocked by relatively minute quantities of water in the capillaries of the formation.

Partial blocking of the flow of oil from a formation is caused sometimes by relatively minor amounts of water in the capillaries of the formation which occurs by water inadvertently entering from the borehole or from an incompletely isolated adjacent water-bearing formation, or which is carried into the formation by occlusion in the flowing oil. The discrete particles of water in the formation capillaries interfere, to a greater or lesser extent, with the flow of oil from the formation into the producing borehole. While even in some cases water may be produced along with the oil, complete expulsion of the water by the oil flowing under an appreciable pressure gradient is prevented by the capillary or surface forces acting on the discontinuous water saturation. This effect, which is particularly pronounced and disadvantageous around the producing borehole, is called "capillary water blocking."

While it may seem obvious to inject a surface-active agent to counteract the forces restraining the movement of the capillary blocking water, it will be found that practical improvements in the flow of oil do not follow simply from injecting into the formation any agent which is capable of lowering surface tension. In other words, even though tensiometer measurements show that a specific agent will reduce the interfacial tension between water or brine and oil, it does not follow that the agent will be effective practically to correct capillary water blocking in an oil-producing earth formation. The reasons why surfactants differ in their ability to correct capillary water blocking in an oil-producing formation are not known, although certain deleterious effects might be pointed out, once the difference is recognized. Among these can be mentioned: possible adsorption of the agent by the rock formation, reaction of the agent with some of the ingredients in the petroleum or in the blocking water (e. g., dissolved salts), and other factors. In any event, the effectiveness of a surfactant to correct capillary water blocking cannot be predicted from simple interfacial tension measurements. Apparently the agent, to be effective, must have not only good interfacial tension lowering properties but also other characteristics. However, these other essential characteristics are unknown, or at best are only partly suspected by hindsight from agents found effective.

I have found that particularly good results are obtained by the use of a certain narrow class of compounds to correct capillary water blocking, and hence it is an object of this invention to provide a superior process of decreasing water blocking in an oil-producing formation.

The process of my invention comprises injecting into the water blocked formation an oil solution of a relatively nonadsorbing agent capable of greatly reducing the interfacial tension between the blocking water and oil and thereafter producing the injected solution and petroleum from the treated formation. The agents in the injected oil solution are certain oil-soluble alkylated phenol polyethylene glycol ethers which are described in more detail hereinbelow.

The present process, as indicated above, is highly efficient in increasing production of oil from a formation partially blocked by capillary water. Whether the improvement is essentially due to removal or displacement of blocking water or is due also to decreased resistance to oil flow even in the water-free pores within the formation, the process results in an apparent increased permeability of the formation to oil flow. As a possible mechanism (to which I do not wish to be bound), the capillary blocking water upon being contacted with the oil solution absorbs some of the special ethers and acquires a reduced surface tension, so that when the flow through the treated formation is reversed the water flows out with the oil either as discrete particles or in a fine emulsion in oil.

The agents used in my process are inexplicably superior to other surfactants tested. Others either do not lower the interfacial tension sufficiently or are apparently adsorbed in the formation or inactivated by the formation waters or are otherwise unsatisfactory. As distinguished from surfactants proposed for addition to water used in secondary recovery flooding, the present agents are predominantly oil-soluble; also, the present agents tend to emulsify water in oil, and this, among its other properties, may contribute to the efficiency of removal of capillary blocking water.

In the process of the present invention, the treating oil solution preferably is introduced in such a way as to avoid contact with water before the solution passes into the formation desired to be treated. Water standing in the borehole may be removed entirely or the section of formation to be treated may be packed off and the water removed only from the packed off section of the borehole. In any event, contamination of the oil solution with water is to be minimized.

After the treating oil solution is injected into the formation, deeper penetration is sometimes advantageous and for this purpose straight oil can be injected to displace the oil solution further into the formation. The method of, and means for, spotting the treating oil solution in the borehole and then displacing it into the desired formation are known to those skilled in the art.

Usually about ½ to 3 barrels of the treating oil solution injected per foot of formation is sufficient to correct water blocking. Depending on the depth of treatment desired, the tightness of the formation, the flow rate and/or extent of water blocking, lesser amounts can sometimes be used to advantage; also depending primarily on economics, larger amounts or additional treatments can be employed. The amounts of displacing oil can range from ½ to 3 volumes per volume of injected treating solution.

After the treating solution has been injected to the desired depth in the formation, the flow can be reversed to produce the formation. An advantage of the present process is that this can be done immediately without substantial loss of effectiveness over allowing the treating solution to remain in the formation for some time, such as 24 hours. However, the latter is not disadvantageous, and, in some cases, such a delay may be convenient. When the formation is placed back on production, most of the injected displacing oil, if any, and treating solution will be produced before formation or connate oil is produced. If desired, the displacing oil and treating solution so produced can be separated and reclaimed.

The predominately oil-soluble alkyl phenol polyoxyethylene ethers used in the present process to obtain superior correction of capillary water blocking have 3 to 25 glycol units, at least 8 and preferably at least 10 carbon atoms in alkyl substituents on the phenol ring, and a ratio of alkyl carbon atoms to glycol units ranging from one and one-third to four. Usually preferred is a ratio ranging from two to three and one-half. The alkyl phenol employed to form the ether can contain one or more alkyl substituents and can be a mixture of alkyl phenols, for example, averaging 2.2 alkyl groups per phenol ring. Although an individual alkyl group can contain up to about 18 carbon atoms, several alkyl groups can amount to 100 carbon atoms in alkyl substituents within the above described ratio. The number of such carbon atoms, however, is usually above about 5.0. Representative alkyl substituents are octyl, nonyl, decyl, tetradecyl, octadecyl and the branched-chain analogues thereof. Suitable alkyl substituents on the phenol ring are obtained by alkylating phenol, cresols, xylenols, etc. with various olefins such as Fischer-Tropsch synthesis olefins, and branched-chain olefins such as the polymers of propylene, butylene, etc.

The foregoing special ethers are dispersed in oil in small amounts sufficient to lower substantially the interfacial tension of the blocking water to oil. Usually amounts of ½ to 2% are preferred. Amounts greater than 5% are ordinarily uneconomical or inefficient.

The oil employed is preferably an aliphatic solvent such as kerosene or diesel fuel. Crude oil can be used but preferably should have a low content of aromatics which tend to decrease the activity of the special ethers. Whatever oil is used in the treating solution should be clean and free of deposit-forming tendencies, so that the injected solution does not damage the formation. The lower viscosity solvent oils such as kerosene will be preferred since the lowered viscosity of the fluid resulting from the dilution will allow a temporary higher rate of production which will tend to sweep out the connate water.

To illustrate the effectiveness of our special polyethylene glycol alkyl phenol ethers, as compared to other agents, core samples from various formations were treated in the following manner: any crude oil in the core sample was displaced with kerosene and the sample saturated with kerosene followed by a measurement of its permeability to kerosene. Then ten pore volumes of synthetic connate water (containing 9.6% NaCl, 0.9% $CaCl_2$ and 0.3% $MgCl_2$) were injected and the core allowed to stand overnight. The water was displaced by kerosene and the partially water-blocked core was measured for permeability to kerosene. Then ten pore volumes of one percent of the selected agent in kerosene were injected and the treated core allowed to stand overnight. The treating solution was then displaced with kerosene and the permeability of the core to kerosene measured again. Three numbers (in millidarcys) were thus obtained for each experiment: the initial oil permeability, the water-blocked oil permeability and the oil permeability after treatment with the agent. All operations were conducted at a constant pressure drop of 10 p. s. i. The results of such experiments are given in the following table:

Table 1

| Origin of Core | | Permeability to Oil (incl.) | | | Percent Increase over blocked Permeability |
|---|---|---|---|---|---|
| | | Initial | Blocked | After Trtmt. | |
| Field A | Commercial Agent A | 221 | 85 | 46 | −46 |
| Do | do | 156 | 16 | 58 | +260 |
| Do | do | 82 | 16 | 14 | −2 |
| Do | $(C_{14}H_{29})\phi(OCH_2-CH_2)_{5.5}OH$ | 322 | 58 | 92 | +59 |
| Do | do | 142 | 24 | 113 | +370 |
| Do | do | 70 | 13 | 38 | +192 |
| Do | do | 90 | 17 | 43 | +153 |
| Field B | Commercial Agent A | 183 | 63 | 74 | +17 |
| Do | do | 180 | 14 | 36 | +157 |
| Do | $(C_{14}H_{29})\phi(OCH_2-CH_2)_{5.5}OH$ | 161 | 10 | 91 | +810 |
| Field C | do | 26 | 2.6 | 4.3 | +65 |
| Do | do | 44 | 2.1 | 15.5 | +630 |
| Do | do | 36 | 1.6 | 8.5 | +440 |

The above results show that the special polyethylene glycol alkylphenol ether is consistently superior to commercial agent A, the cores from field B tended to water block more readily than field A cores and illustrates the type of formation in which treatment with the present agents would be most beneficial. The improvement from treating field B cores with the present agent is quite startling.

The commercial agent A used in the foregoing experiments is a material marketed by Atlas Powder Company under the trade name "Atpet 931" and is believed to be a polyethylene oxide sorbitol ester with mixed higher fatty acids.

The polyethylene glycol alkyl phenol ether used in the above experiments and identified by the formula $$(C_{14}H_{29})\phi(OCH_2CH_2)_{5.5}OH$$

was obtained by first alkylating phenol with a propylene polymer having an average of 14 carbon atoms in the polymer chain. The resultant alkyl phenol is then condensed with an average of 5.5 ethylene glycol units per molecule of alkyl phenol. The product has the foregoing average formula.

The ability of the foregoing special ether and the suitable closely related compounds within the defined class of polyethylene glycol ethers of alkyl phenols to lower interfacial tension between kerosene and the synthetic connate water is illustrated by the measurements at 0.1% concentration, using the pendant drop method, in the following table:

Table 2

| Polyethylene Glycol Alkyl Phenyl Ether | Interfacial Tension (dynes/cm.$^2$) |
|---|---|
| $(C_{14}H_{29})_{2.2}\phi(OCH_2CH_2)_3OH$ | >.1 |
| $(C_{14}H_{29})_{2.2}\phi(OCH_2CH_2)_{5.5}OH$ | .03 |
| $(C_{14}H_{29})_{2.2}\phi(OCH_2CH_2)_9OH$ | <.001 |
| $(C_{14}H_{29})_{2.2}\phi(OCH_2CH_2)_{10}OH$ | <.001 |
| $(C_{14}H_{29})_{2.2}\phi(OCH_2CH_2)_{11}OH$ | <.001 |
| $(C_{14}H_{29})_{2.2}\phi(OCH_2CH_2)_{12}OH$ | <.001 |
| $(C_{14}H_{29})_{2.2}\phi(OCH_2CH_2)_{17}OH$ | <.001 |
| $(C_{14}H_{29})_{2.2}\phi(OCH_2CH_2)_{23}OH$ | <.000 |
| $(C_{14}H_{29})_{2.2}\phi(OCH_2CH_2)_{51}OH$ | .1 |
| $C_{14}H_{29}\phi(OCH_2CH_2)_2OH$ | >.1 |
| $C_{14}H_{29}\phi(OCH_2CH_2)_{4.25}OH$ | <.1, >.001 |
| $C_{14}H_{29}\phi(OCH_2CH_2)_{5.5}OH$ | <.001 |
| $C_{14}H_{29}\phi(OCH_2CH_2)_9OH$ | <.001 |
| $C_{14}H_{29}\phi(OCH_2CH_2)_0OH$ | .033 |
| $C_{10}H_{21}\phi(OCH_2CH_2)_4OH$ | <.01, >.001 |
| $C_{10}H_{21}\phi(OCH_2CH_2)_5OH$ | <.01, >.001 |
| $C_{10}H_{21}\phi(OCH_2CH_2)_9OH$ | <.01, >.001 |
| $C_{10}H_{21}\phi(OCH_2CH_2)_7OH$ | .03–.1 |
| $C_{10}H_{21}(OCH_2CH_2)_{10}OH$ | .03–.1 |
| $C_8H_{17}\phi(OCH_2CH_2)OH$ | >.1 |
| $C_8H_{17}\phi(OCH_2CH_2)_6OH$ | .03 |
| $C_8H_{17}\phi(OCH_2CH_2)_{10}OH$ | .03–.1 |

The above tests show that the polyalkylene glycol ethers of alkyl phenols which give the most reduction in interfacial tension are those within the class of ethers defined hereinabove.

In a further test of the present invention, the treatment was applied to a well which was believed to have been previously damaged by water block. Other wells in the same field have a history of rapid decline after water production becomes more than a few barrels per day. Immediately before the test the well had been producing 35 to 40 barrels per day of oil and 7 to 9 barrels per day of water. The well was treated with 334 barrels of diesel oil containing 1% of the aforementioned ether idenified by the formula $(C_{14}H_{29})\varphi(OCH_2CH_2)_{5.5}OH$; this amount was sufficient to allow 2 barrels of treating solution to each vertical foot of the formation treated. After the treatment and recovery of the diesel oil carrier, the well produced 70 barrels per day of oil and 15 barrels per day of water. Thus, the oil production was about doubled by the treatment. Two months later the well was still producing 62 barrels of oil per day and 12 barrels of water per day.

I claim:

1. An improved method for increasing the permeability to oil of an oil-producing formation which has decreased permeability due to partial blocking by relatively small quantities of water in the capillary interstices of said oil-producing formation, said method comprising injecting through the bore hole penetrating said formation and into said oil-producing formation an oil solution of an oil soluble alkylated phenol polyethylene glycol ether having 3 to 25 glycol units, at least 8 carbon atoms in the oil-solubilizing alkyl portion, and a ratio of alkyl carbon atoms to the number of glycol units ranging from one and one-third to four, said ether being present in the oil in a small amount less than 5% but sufficient to lower substantially the interfacial tension of the blocking water to oil, and thereafter producing said injected oil solution and formation oil from said borehole, thereby removing water blocking and increasing the effective permeability to oil of said oil-producing formation.

2. The process of claim 1 wherein said oil of said solution is an aliphatic oil selected from the group consisting of kerosene and diesel fuel.

3. The process of claim 1 wherein at least one-half barrel of said oil solution is injected into each foot of formation to be treated.

4. The method of claim 1 wherein said oil-soluble alkylated phenol polyethylene glycol ether is the product obtained by alkylating phenol with a propylene polymer averaging 14 carbon atoms in the polymer chain and by condensing the resultant alkylated phenol with an average of about 5.5 ethylene glycol ether units per molecule of alkylated phenol.

5. A process for decreasing capillary water blocking in an oil-producing formation in the vicinity of the borehole through which said formation is produced, which process comprises injecting through said borehole into each foot of said oil producing formation to be treated from ½ to 3 barrels of an aliphatic oil solution of an oil-soluble polyethylene glycol monoether of alkylated phenol wherein said ether has 3 to 25 glycol units, at least 8 carbon atoms in the oil-solubilizing alkyl portion and a ratio of alkyl carbon atoms to the number of glycol units ranging from one and one-third to four, said ether being present in said solvent oil in a small amount less than 5% but sufficient to lower substantially the interfacial tension of the blocking water to oil, then immediately after the ether-in-oil solution injecting into each foot of formation treated ½ to 3 barrels of an oil to displace the treating oil solution further into the formation, and thereafter producing the injected oil and oil solution from said borehole in the treated formation, thereby removing water blocking and increasing the permeability to oil of said oil-producing formation.

6. An improved method for increasing the permeability to oil of an oil-producing formation which has decreased permeability due to partial blocking by minute quantities of water in capillary interstices in the portion of the formation near the borehole through which said formation is produced, said method comprising removing water from that portion of the borehole which penetrates the section of the oil-producing formation to be treated, then introducing through said borehole into said section of the oil-producing formation an oil solution containing ½ to 2% of an oil-soluble polyethylene glycol monoether of alkylated phenol, said ether having at least 10 carbon atoms in the alkyl portion, 3 to 25 glycol units, and the ratio of alkyl carbon atoms to the number of glycol units ranging from two to three and one-half, and thereafter producing the treated formation from said borehole.

References Cited in the file of this patent

UNITED STATES PATENTS

| 2,213,477 | Steindorff et al. | Sept. 3, 1940 |
| 2,369,831 | Jones et al. | Feb. 20, 1945 |
| 2,731,090 | Johnston | Jan. 17, 1956 |
| 2,748,080 | Newcombe et al. | May 29, 1956 |
| 2,796,131 | Hinchliffe et al. | June 18, 1957 |

UNITED STATES PATENT OFFICE
Certificate of Correction

February 24, 1959

Patent No. 2,874,779          Carl E. Johnson, Jr.

It is hereby certified that error appears in the printed specification of the above numbered patent requiring correction and that the said Letters Patent should read as corrected below.

Column 5, Table 2, first column thereof, under the heading "Polyethylene Glycol Alkyl Phenyl Ether", fourth line from the bottom, for "$C_{10}H_{21}$" read —$C_{10}H_{21}\phi$—; same table, second column thereof, under the heading "Interfacial Tension (dynes/cm.$^2$)" eleventh line from the top, for "<.1," read —<.01,—.

Signed and sealed this 26th day of May 1959.

[SEAL]

Attest:
KARL H. AXLINE,
*Attesting Officer.*

ROBERT C. WATSON,
*Commissioner of Patents.*